United States Patent
Kazi et al.

(10) Patent No.: US 10,437,676 B2
(45) Date of Patent: Oct. 8, 2019

(54) URGENT READS AND USING DATA SOURCE HEALTH TO DETERMINE ERROR RECOVERY PROCEDURES

(71) Applicant: International Business Machines Corporation, Armonk, NY (US)

(72) Inventors: Asimuddin Kazi, Naperville, IL (US); Jason K. Resch, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 119 days.

(21) Appl. No.: 15/842,298

(22) Filed: Dec. 14, 2017

(65) Prior Publication Data

US 2018/0107548 A1    Apr. 19, 2018

Related U.S. Application Data

(63) Continuation-in-part of application No. 14/986,279, filed on Dec. 31, 2015, now Pat. No. 10,069,915.

(60) Provisional application No. 62/121,667, filed on Feb. 27, 2015.

(51) Int. Cl.
*G06F 11/10* (2006.01)
*G06F 3/06* (2006.01)

(52) U.S. Cl.
CPC .......... *G06F 11/1092* (2013.01); *G06F 3/064* (2013.01); *G06F 3/067* (2013.01); *G06F 3/0619* (2013.01); *G06F 11/108* (2013.01)

(58) Field of Classification Search
CPC .. G06F 11/1092; G06F 11/108; G06F 3/0619; G06F 3/064; G06F 3/067
See application file for complete search history.

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |

(Continued)

OTHER PUBLICATIONS

Chung; An Automatic Data Segmentation Method for 3D Measured Data Points; National Taiwan University; pp. 1-8; 1998.

(Continued)

*Primary Examiner* — Blake J Rubin
(74) *Attorney, Agent, or Firm* — Garlick & Markison; Shayne X. Short

(57) ABSTRACT

A computing device includes an interface configured to interface and communicate with a dispersed storage network (DSN), a memory that stores operational instructions, and processing circuitry operably coupled to the interface and to the memory. The processing circuitry is configured to execute the operational instructions to perform various operations and functions. The computing device determine status of a set of memory devices of one or more sets of storage units (SUs) that distributedly store a set of encoded data slices (EDSs) within the DSN. The computing device detects one or more memory devices thereof that are failing and determines a number of available EDSs. When an insufficient number of EDSs are available, the computing device issues urgent read slice request(s) to recover additional available EDS(s) and facilitate temporary storage thereof within the DSN.

20 Claims, 7 Drawing Sheets

(56) References Cited

U.S. PATENT DOCUMENTS

| | | |
|---|---|---|
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 7,681,104 B1 * | 3/2010 | Sim-Tang ............ H04L 1/0057 714/763 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0199089 A1 * | 8/2010 | Vysogorets ............ G06F 21/34 713/168 |
| 2010/0306524 A1 * | 12/2010 | Runkis ................. H04L 9/0894 713/150 |
| 2010/0332751 A1 | 12/2010 | Quigley et al. |
| 2013/0013931 A1 * | 1/2013 | O'Hare ................. H04L 9/0822 713/189 |
| 2013/0204849 A1 * | 8/2013 | Chacko ................. G06F 3/0604 707/692 |
| 2014/0156716 A1 | 6/2014 | Baptist et al. |
| 2016/0147471 A1 * | 5/2016 | O'Hare ................. G06F 3/0619 713/171 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Internationalized String Preparation; IETF Network Norking Group; RFC 4518; Jun. 2006; pp. 1-14.

* cited by examiner

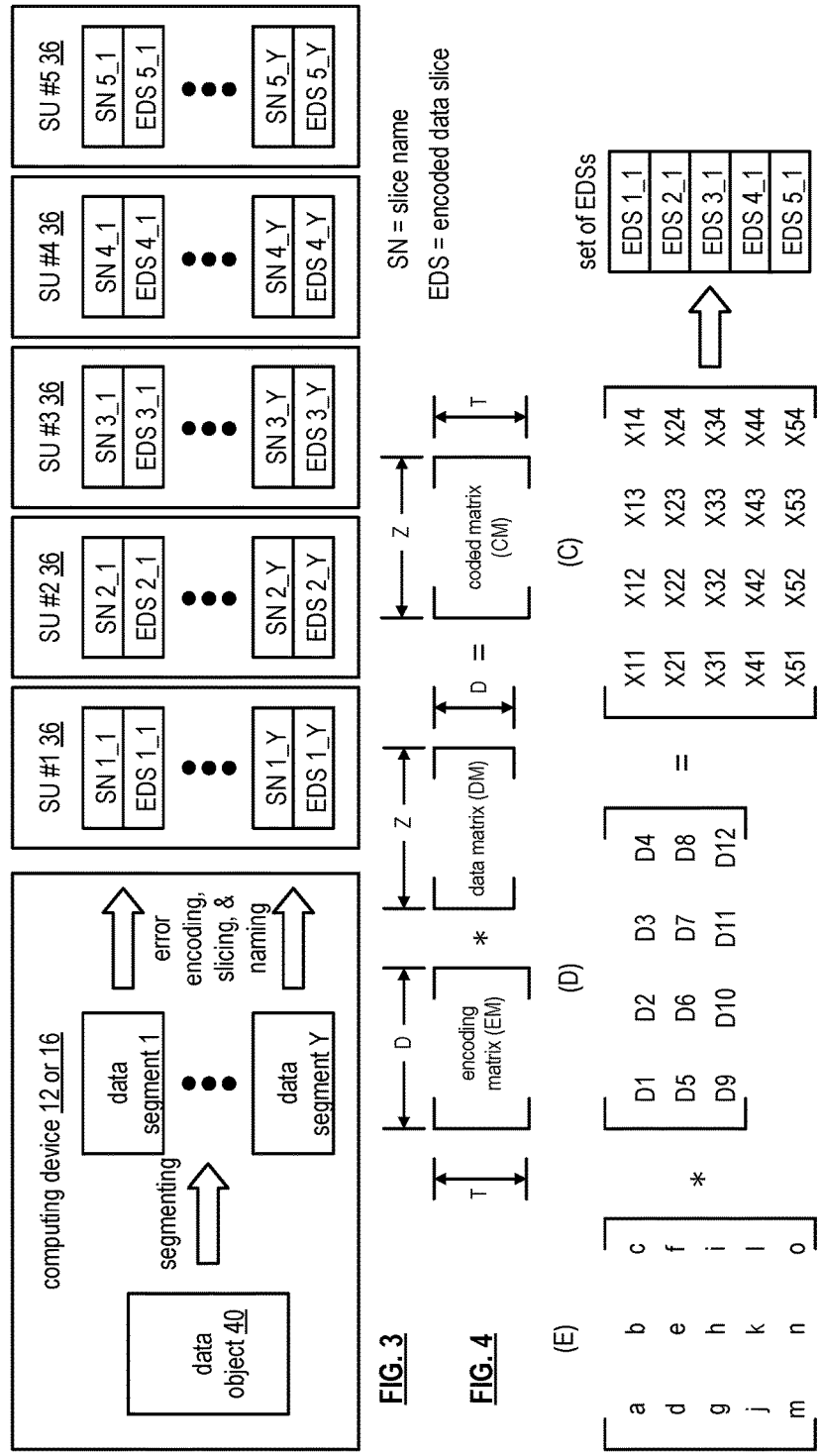

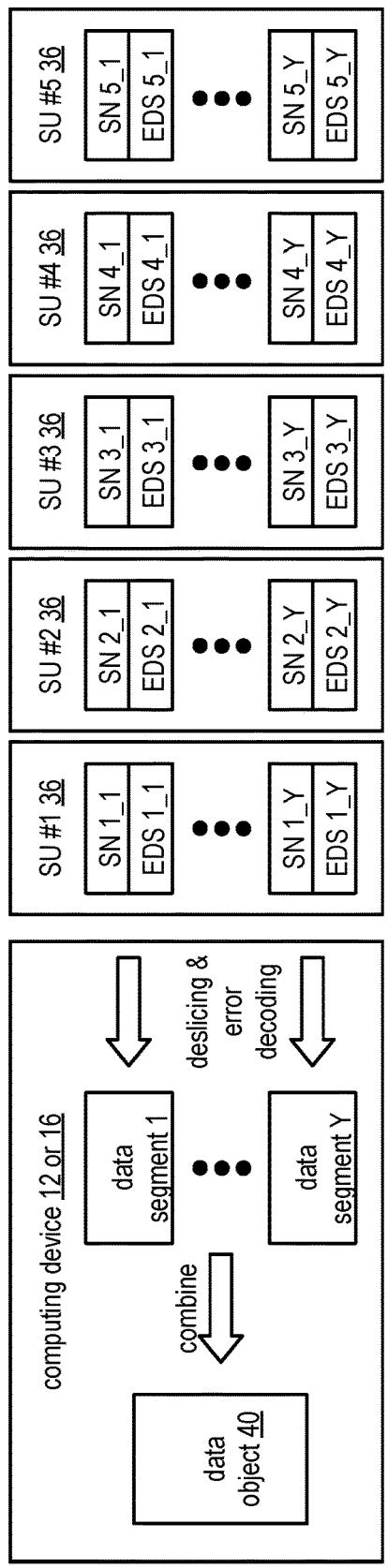

URGENT READS AND USING DATA SOURCE HEALTH TO DETERMINE ERROR RECOVERY PROCEDURES

CROSS REFERENCE TO RELATED PATENTS

The present U.S. Utility Patent Application claims priority pursuant to 35 U.S.C. § 120 as a continuation-in-part (CIP) of U.S. Utility patent application Ser. No. 14/986,279, entitled "STORING DATA IN A DISPERSED STORAGE NETWORK," filed Dec. 31, 2015, which claims priority pursuant to 35 U.S.C. § 119(e) to U.S. Provisional Application No. 62/121,667, entitled "SELECTING A STORAGE POOL OF A DISPERSED STORAGE NETWORK," filed Feb. 27, 2015, both of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Prior art data storage systems do not have acceptable mechanisms by which data may be preserved from failed and/or failing components therein. The prior art can suffer from total loss of information and data when components therein fail. There continues to be a need for improvements in the manner by which data storage systems operate and function.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

DETAILED DESCRIPTION OF THE INVENTION

Figure 1:
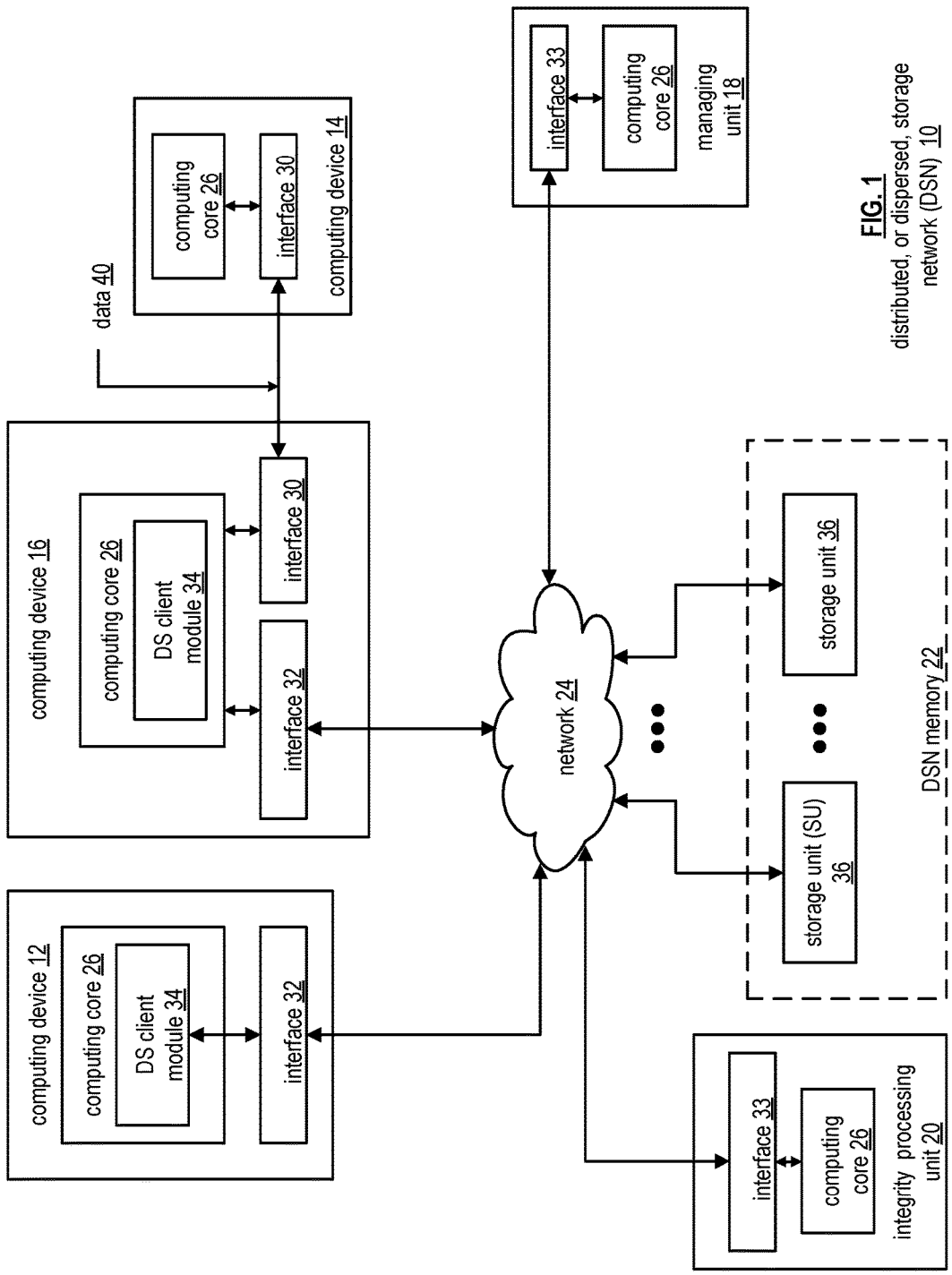
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
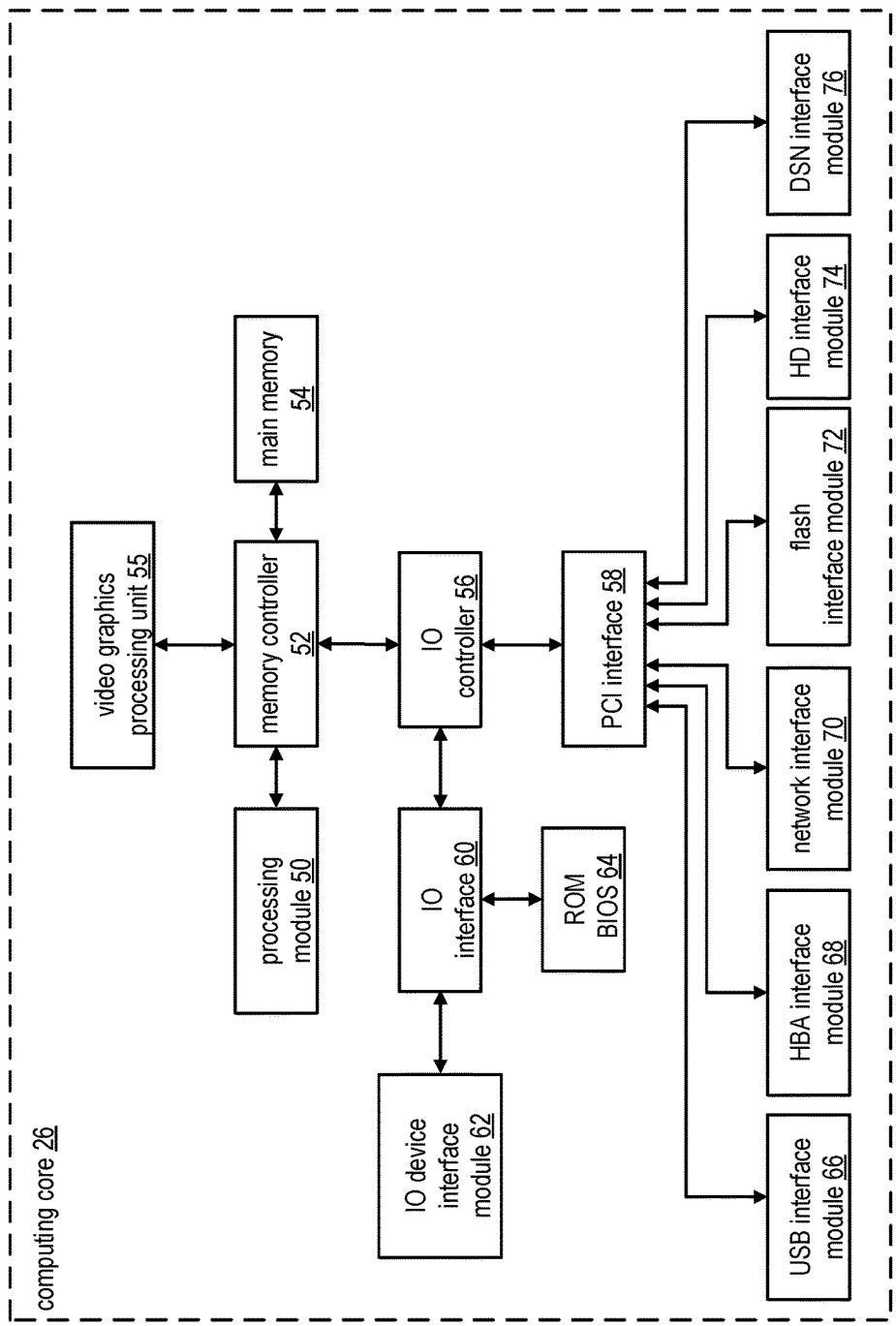
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In some examples, note that dispersed or distributed storage network (DSN) memory includes one or more of a plurality of storage units (SUs) such as SUs 36 (e.g., that may alternatively be referred to a distributed storage and/or task network (DSTN) module that includes a plurality of distributed storage and/or task (DST) execution units 36 that may be located at geographically different sites (e.g., one in Chicago, one in Milwaukee, etc.). Each of the SUs (e.g., alternatively referred to as DST execution units in some examples) is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Figure 9:
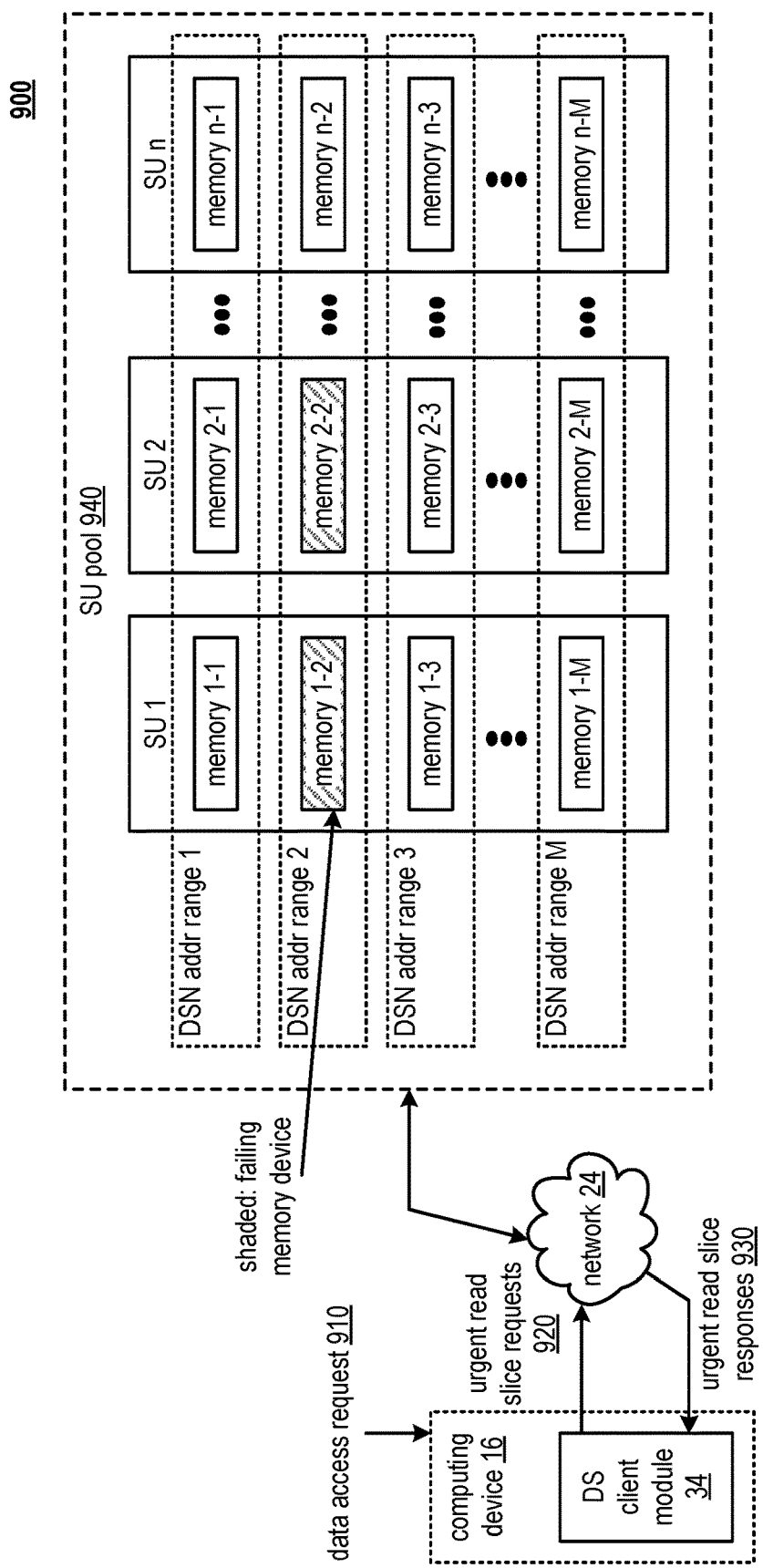
FIG. 9 is a schematic block diagram of another embodiment of a dispersed storage network (DSN) in accordance with the present invention.

FIG. 9 is a schematic block diagram of another embodiment of a dispersed storage network (DSN) in accordance with the present invention. This diagram includes a schematic block diagram of another embodiment of a dispersed storage network (DSN) that includes the computing device 16 of FIG. 1, the network 24 of FIG. 1, and a storage unit (SU) pool 940. The computing device 16 includes the DS client module 34 of FIG. 1. The SU pool 940 includes a set of SUs 1-n. Each SU includes a set of M memories.

The DSN functions to select a data integrity maintenance process for maintaining integrity of stored data within the SU pool 940. In an example of operation of the selecting of the data integrity maintenance process, the DS client module 34 detects one or more failing memory devices of a set of memory devices associated with a DSN address range, where a plurality of DSN address ranges 1-M are associated with the set of SUs. The detecting includes at least one of interpreting a received error message, initiating a query, receiving a query response, initiating a memory test, and interpreting a memory test result.

The plurality of DSN address ranges 1-M includes the DSN address range, where a data object is stored as a plurality of sets of encoded data slices in at least one set of memory devices. The data object is divided into a plurality of data segments where each data segment is dispersed storage error encoded to produce a set of encoded data slices for storing in a corresponding set of memory devices. For example, the DS client module 34 receives error messages indicating that memories 1-2 and 2-2 are failing of the set of memory devices associated with the DSN address range 2.

For a data segment of the plurality of data segments, the DS client module 34 determines a number of available encoded data slices of a corresponding set of encoded data slices stored in a corresponding set of memory devices. The determining includes at least one of interpreting a list of slice responses, interpreting read slice responses, and interpreting one or more error messages.

When the number of available encoded data slices compares unfavorably to a rebuilding threshold level (e.g., less than the rebuilding threshold level), the DS client module 34 initiates a data salvaging process to recover encoded data slices of the set of encoded data slices from the corresponding failing memory devices. For example, the DS client module 34 issues, via the network 24, urgent read slice requests 920 for the encoded data slices to be recovered to the SUs corresponding to the failing memory devices. For instance, the DS client module 34 issues, via the network 24, the urgent read slice requests 920 to SUs 1 and 2 to quickly recover recoverable encoded data slices from the memories 1-2, and 2-2. SUs receiving a corresponding urgent read slice request prioritizes issuing a corresponding urgent read slice response. The prioritizing includes one or more of de-prioritizing one or more of other access requests (e.g., data access requests 910) and maintenance tasks and raising priority of execution of tasks related to issuing the urgent read slice response (e.g., SU 1 immediately accesses the memory 1-2 to recover encoded data slices prior to a complete failure of the memory 1-2).

Having issued the urgent read slice request, the DS client module 34 receives, via the network 24, urgent read slice responses 930. Having received the urgent read slice responses 930, the DS client module 34 facilitates temporary storage of encoded data slices extracted from the received urgent read slice responses 930. For example, the DS client module 34 sends the extracted encoded data slices to another SU for temporary storage.

In an example of operation and implementation, a computing device includes an interface configured to interface and communicate with a dispersed or distributed storage network (DSN), a memory that stores operational instructions, and a processing module, processor, and/or processing circuitry operably coupled to the interface and memory. The processing module, processor, and/or processing circuitry is configured to execute the operational instructions to perform various operations, functions, etc. In some examples, the processing module, processor, and/or processing circuitry, when operable within the computing device based on the operational instructions, is configured to perform various operations, functions, etc. In certain examples, the processing module, processor, and/or processing circuitry, when operable within the computing device is configured to perform one or more functions that may include generation of one or more signals, processing of one or more signals, receiving of one or more signals, transmission of one or more signals, interpreting of one or more signals, etc. and/or any other operations as described herein and/or their equivalents.

In an example of operation and implementation, a computing device (e.g., computing device 16 of FIG. 1, FIG. 9, and/or any other diagram, example, embodiment, equivalent, etc. as described herein) is configured to determine status of a set of memory devices of one or more sets of storage units (SUs) that distributedly store a set of encoded data slices (EDSs) within the DSN. Note that a data object is segmented into a plurality of data segments, and a data segment of the plurality of data segments is dispersed error encoded in accordance with dispersed error encoding parameters to produce the set of EDSs.

The computing device is also configured to process the status of the set of memory devices of the one or more sets of SUs to detect one or more memory devices thereof that are failing based on at least one criterion. The computing device is also configured to determine a number of available EDSs of the set of EDSs among the set of memory devices of the one or more sets of SUs.

When the number of available EDSs of the set of EDSs compares unfavorably to a data segment rebuild threshold level, the computing device is also configured to issue at least one urgent read slice request to at least one SU of the one or more sets of SUs that is associated with at least one of the one or more memory devices that is failing to recover at least one additional available EDS of the set of EDSs there from.

The computing device is also configured to receive the at least one additional available EDS of the set of EDSs from the at least one of the one or more memory devices that is failing and to facilitate temporary storage of the at least one additional available EDS of the set of EDSs within the DSN.

In some examples, the computing device is also configured to detect the one or more memory devices thereof that are failing based on at least one criterion including based on interpreting a received error message, initiating a query, receiving a query response, initiating a memory test, and/or interpreting a memory test result.

In even other examples, the computing device is also configured to determine the number of available EDSs of the set of EDSs among the set of memory devices of the one or more sets of SUs based on interpreting a list of slice responses, interpreting read slice responses, and/or interpreting one or more error messages.

In yet other examples, when the number of available EDSs of the set of EDSs compares unfavorably to the data segment rebuild threshold level, the computing device is also configured to issue a plurality of urgent read slice requests to a plurality of SUs of the one or more sets of SUs that is associated with the at least one of the one or more memory devices that is failing to recover a plurality of additional available EDSs of the set of EDSs there from. The computing device is also configured to prioritize the plurality of urgent read slice requests based on deprioritizing one or more of other access requests or maintenance tasks and raising priority of execution of tasks related to issuing the plurality of urgent read slice requests.

In some examples, with respect to a data object, the data object is segmented into a plurality of data segments, and a data segment of the plurality of data segments is dispersed error encoded in accordance with dispersed error encoding parameters to produce a set of encoded data slices (EDSs) (e.g., in some instances, the set of EDSs are distributedly stored in a plurality of storage units (SUs) within the DSN). In some examples, the set of EDSs is of pillar width. Also, with respect to certain implementations, note that the decode threshold number of EDSs are needed to recover the data segment, and a read threshold number of EDSs provides for reconstruction of the data segment. Also, a write threshold number of EDSs provides for a successful transfer of the set of EDSs from a first at least one location in the DSN to a second at least one location in the DSN. The set of EDSs is of pillar width and includes a pillar number of EDSs. Also, in some examples, each of the decode threshold, the read threshold, and the write threshold is less than the pillar number. Also, in some particular examples, the write threshold number is greater than or equal to the read threshold number that is greater than or equal to the decode threshold number.

Note that the computing device as described herein may be located at a first premises that is remotely located from a second premises associated with at least one other SU, dispersed storage (DS) unit, computing device, at least one SU of a plurality of SUs within the DSN (e.g., such as a plurality of SUs that are implemented to store distributedly a set of EDSs), etc. In addition, note that such a computing device as described herein may be implemented as any of a number of different devices including a managing unit that is remotely located from another SU, DS unit, computing device, etc. within the DSN and/or other device within the DSN, an integrity processing unit that is remotely located from another computing device and/or other device within the DSN, a scheduling unit that is remotely located from another computing device and/or SU within the DSN, and/or other device. Also, note that such a computing device as described herein may be of any of a variety of types of devices as described herein and/or their equivalents including a DS unit and/or SU included within any group and/or set of DS units and/or SUs within the DSN, a wireless smart phone, a laptop, a tablet, a personal computers (PC), a work station, and/or a video game device, and/or any type of computing device or communication device. Also, note also that the DSN may be implemented to include and/or be based on any of a number of different types of communication systems including a wireless communication system, a wire lined communication system, a non-public intranet system, a public internet system, a local area network (LAN), and/or a wide area network (WAN). Also, in some examples, any device configured to support communications within such a DSN may be also be configured to and/or specifically implemented to support communications within a satellite communication system, a wireless communication system, a wired communication system, a fiber-optic communication system, and/or a mobile communication system (and/or any other type of communication system implemented using any type of communication medium or media).

Figure 10:
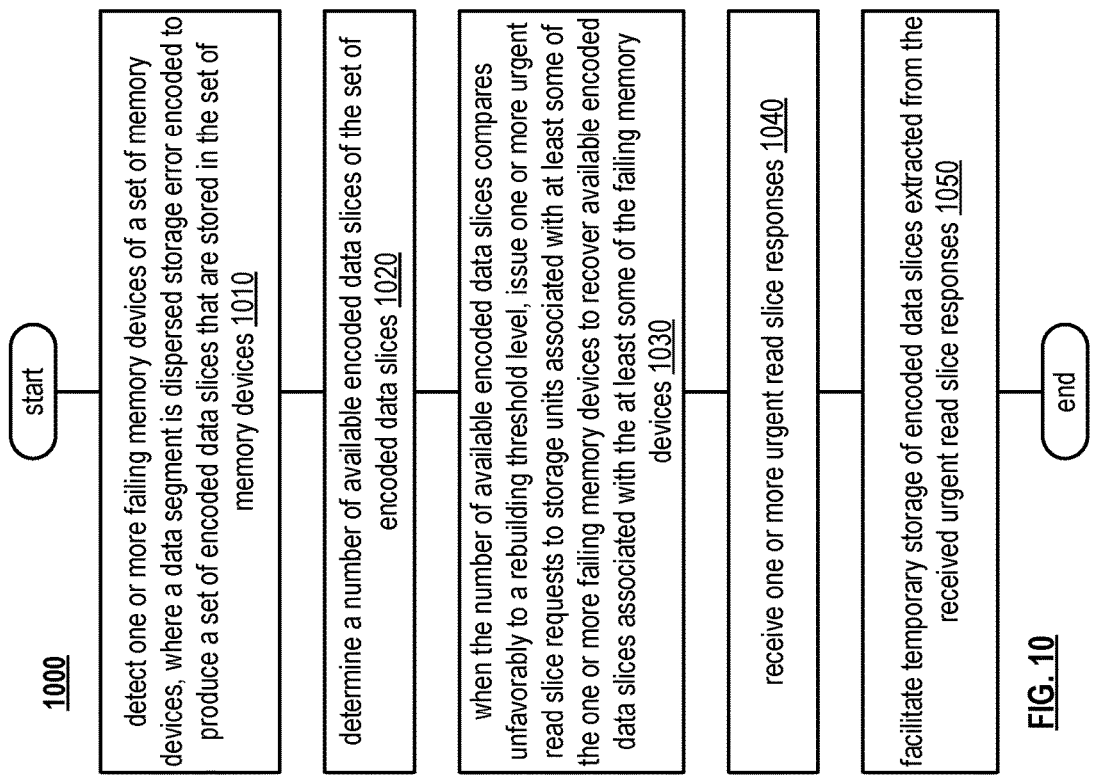
FIG. 10 is a flowchart illustrating an example of selecting a data integrity maintenance process in accordance with the present invention.

FIG. 10 is a flowchart illustrating an example of selecting a data integrity maintenance process in accordance with the present invention. This diagram includes a flowchart illustrating an example of selecting a data integrity maintenance process. The method 1000 begins or continues at a step 1010 where a processing module (e.g., of a distributed storage (DS) client module and/or computing device) detects one or more failing memory devices of a set of memory devices, where a data segment is dispersed storage error encoded to produce a set of encoded data slices that are stored in the set of memory devices. The detecting includes one or more of interpreting an error message, interpreting a query response, interpreting a read slice response, correlating identified failed memory devices with a common set of memory devices.

The method 1000 continues at the step 1020 where the processing module determines a number of available encoded data slices of the set of encoded data slices. The determining includes at least one of identifying a data object associated with storage of the set of encoded data slices in the set of memory devices, interpreting list slice responses, interpreting read slice responses, and interpreting error messages.

When the number of available encoded data slices compares unfavorably to a rebuilding threshold level, the method 1000 continues at the step 1030 where the processing module issues one or more urgent read slice requests to storage units associated with at least some of the one or more failing memory devices to recover available encoded data slices associated with the at least some of the feeling memory devices. The issuing includes at least one of determining that the number of available encoded data slices is less than the rebuilding threshold level, and determining that the number of available encoded data slices is substantially the same as at least one of a decode threshold number and a read threshold number. The issuing further includes identifying the storage units associated with the failing memory devices associated with a set of encoded data slices, generating the one or more urgent read slice request, and sending the generated one or more urgent read slice requests to the identified storage units.

The method 1000 continues at the step 1040 where the processing module receives one or more urgent read slice responses that includes one or more encoded data slices. The method 1000 continues at the step 1050 where the processing module facilitates temporary storage of encoded data slices extracted from the received urgent read slice responses. For example, the processing module issues a write slice request to a storage unit associated with an unavailable memory device to store the extracted encoded data slices, where the write slice request includes the extracted encoded data slices.

Figure 11:
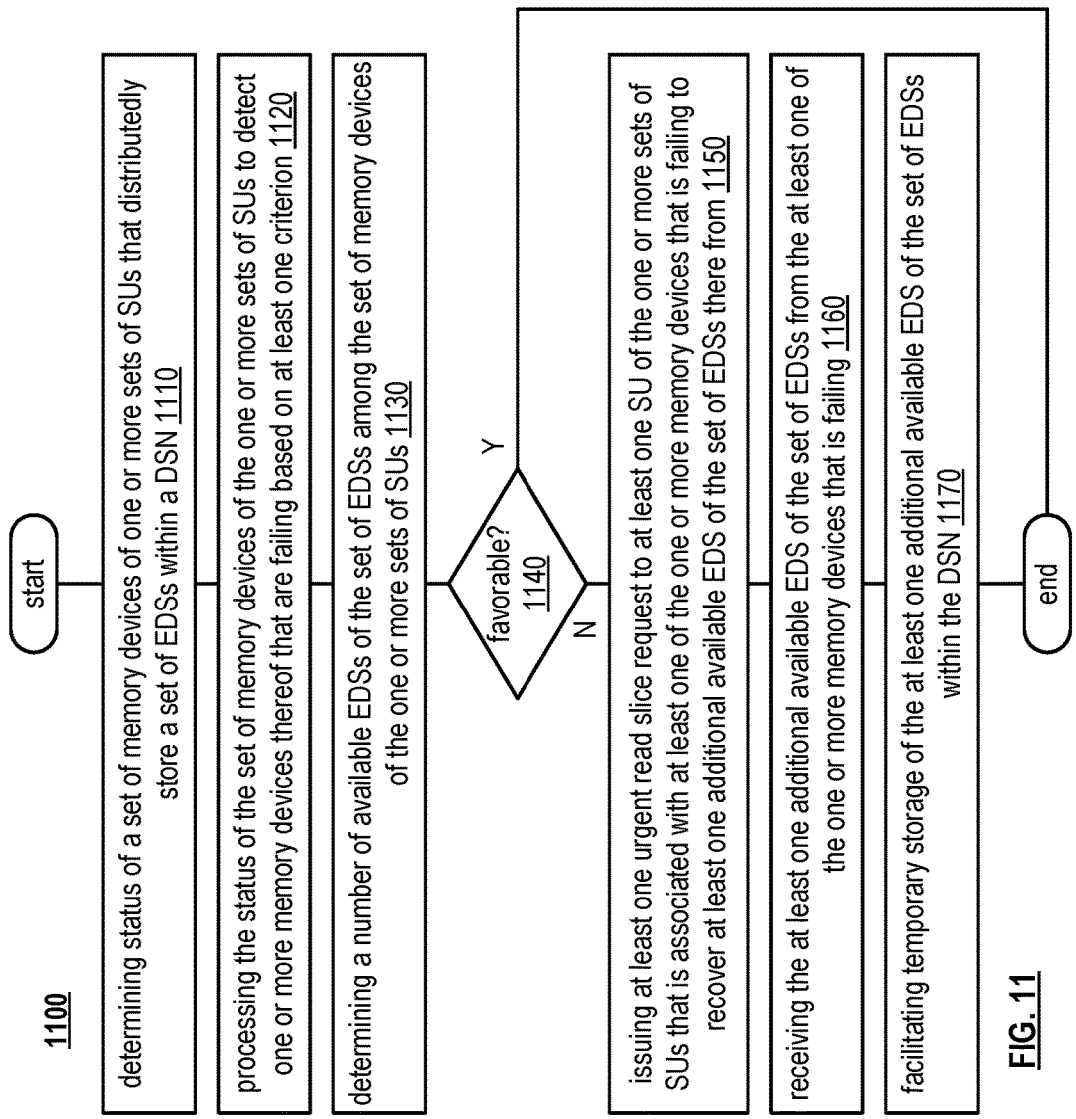
FIG. 11 is a diagram illustrating an embodiment of a method for execution by one or more computing devices in accordance with the present invention.

FIG. 11 is a diagram illustrating an embodiment of a method 1100 for execution by one or more computing devices in accordance with the present invention. The method 1100 operates in step 1110 by determining status of a set of memory devices of one or more sets of storage units (SUs) that distributedly store a set of encoded data slices (EDSs) within a dispersed or distributed storage network (DSN). Note that a data object is segmented into a plurality of data segments, and a data segment of the plurality of data segments is dispersed error encoded in accordance with dispersed error encoding parameters to produce the set of EDSs.

The method 1100 then continues in step 1120 by processing the status of the set of memory devices of the one or more sets of SUs to detect one or more memory devices thereof that are failing based on at least one criterion. The method 1100 operates in step 1130 by determining a number of available EDSs of the set of EDSs among the set of memory devices of the one or more sets of SUs.

When the number of available EDSs of the set of EDSs compares favorably to a data segment rebuild threshold level (step 1140), the method 1100 branches via the yes branch and ends. Alternatively, when the number of available EDSs of the set of EDSs compares unfavorably to a data segment rebuild threshold level (step 1140), the method 1100 branches via the no branch to step 1150 by issuing (e.g., via an interface of the computing device that is configured to interface and communicate with the DSN) at least one urgent read slice request to at least one SU of the one or more sets of SUs that is associated with at least one of the one or more memory devices that is failing to recover at least one additional available EDS of the set of EDSs there from.

The method 1100 then operates in step 1160 by receiving (e.g., via the interface) the at least one additional available EDS of the set of EDSs from the at least one of the one or more memory devices that is failing. The method 1100 operates in step 1170 by facilitating (e.g., via the interface) temporary storage of the at least one additional available EDS of the set of EDSs within the DSN.

This disclosure presents, among other things, various novel solutions that operate to provide for urgent reads and using data source health to determine error recovery procedures. For example, when a memory device fails, a decision must be made as to whether to attempt to salvage as much data as possible from the failed memory device or to fail the memory device and begin rebuilding. The advantage of rebuilding is that it can be faster, while the advantage of salvaging data from the failed memory device is that it avoids impacting the rest of the system with network and TO required for the rebuilding. However, there is another important distinction: the latter approach may be the only option to prevent data loss at the point when the data source is at or close to IDA threshold. Therefore, the state of the data sources and health of the namespace range of the failed/failing memory device is considered by a storage unit (SU) when determining whether to fail the memory device and rebuild, or to attempt a potentially lengthy salvaging procedure from the memory device (or some combination of both rebuilding and salvaging). When a SU determines that sources within the namespace range owned by the failing memory device are close to threshold, it will defer completely failing the drive until as much data as possible has been recovered. Additionally, a computing device may issue an "UrgentReadRequest". An urgent read request may occur only when the read would otherwise fail due to inability to meet IDA threshold. A normal ReadRequest which is routed to a failing memory device may be failed with an IO error (as attempting to read from a failing memory device may cause severe performance problems and interfere with a salvaging procedure). However, an UrgentRead request may be issued if the data source would be below IDA (or read) threshold if the failing memory device is not read from. This bypasses normal checks by the SU, and the SU will attempt to read from a failing memory device when an urgent read request is received, thus possibly enabling the source to be read.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
   an interface configured to interface and communicate with a dispersed or distributed storage network (DSN);
   memory that stores operational instructions; and
   processing circuitry operably coupled to the interface and to the memory, wherein the processing circuitry is configured to execute the operational instructions to:
   determine status of a set of memory devices of one or more sets of storage units (SUs) that distributedly store a set of encoded data slices (EDSs) within the DSN, wherein a data object is segmented into a plurality of data segments, wherein a data segment of the plurality of data segments is dispersed error encoded in accordance with dispersed error encoding parameters to produce the set of EDSs;

process the status of the set of memory devices of the one or more sets of SUs to detect one or more memory devices thereof that are failing based on at least one criterion;

determine a number of available EDSs of the set of EDSs among the set of memory devices of the one or more sets of SUs;

when the number of available EDSs of the set of EDSs compares unfavorably to a data segment rebuild threshold level, issue at least one urgent read slice request to at least one SU of the one or more sets of SUs that is associated with at least one of the one or more memory devices that is failing to recover at least one additional available EDS of the set of EDSs there from;

receive the at least one additional available EDS of the set of EDSs from the at least one of the one or more memory devices that is failing; and facilitate temporary storage of the at least one additional available EDS of the set of EDSs within the DSN.

2. The computing device of claim 1, wherein the processing circuitry is further configured to execute the operational instructions to:

detect the one or more memory devices thereof that are failing based on at least one criterion including based on at least one of interpreting a received error message, initiating a query, receiving a query response, initiating a memory test, or interpreting a memory test result.

3. The computing device of claim 1, wherein the processing circuitry is further configured to execute the operational instructions to:

determine the number of available EDSs of the set of EDSs among the set of memory devices of the one or more sets of SUs based on at least one of interpreting a list of slice responses, interpreting read slice responses, or interpreting one or more error messages.

4. The computing device of claim 1, wherein the processing circuitry is further configured to execute the operational instructions to:

when the number of available EDSs of the set of EDSs compares unfavorably to the data segment rebuild threshold level, issue a plurality of urgent read slice requests to a plurality of SUs of the one or more sets of SUs that is associated with the at least one of the one or more memory devices that is failing to recover a plurality of additional available EDSs of the set of EDSs there from; and prioritize the plurality of urgent read slice requests based on at least one of deprioritizing one or more of other access requests and maintenance tasks or raising priority of execution of tasks related to issuing the plurality of urgent read slice requests.

5. The computing device of claim 1, wherein:

a decode threshold number of EDSs are needed to recover the data segment;

a read threshold number of EDSs provides for reconstruction of the data segment;

a write threshold number of EDSs provides for a successful transfer of the set of EDSs from a first at least one location in the DSN to a second at least one location in the DSN;

the set of EDSs is of pillar width and includes a pillar number of EDSs;

each of the decode threshold number, the read threshold number, and the write threshold number is less than the pillar number; and the write threshold number is greater than or equal to the read threshold number that is greater than or equal to the decode threshold number.

6. The computing device of claim 1, wherein the computing device is located at a first premises that is remotely located from a second premises of the at least one SU of the one or more sets of SUs within the DSN.

7. The computing device of claim 1 further comprising:

a SU of the one or more sets of SUs within the DSN, a wireless smart phone, a laptop, a tablet, a personal computers (PC), a work station, or a video game device.

8. The computing device of claim 1, wherein the DSN includes at least one of a wireless communication system, a wire lined communication system, a non-public intranet system, a public internet system, a local area network (LAN), or a wide area network (WAN).

9. A computing device comprising:

an interface configured to interface and communicate with a dispersed or distributed storage network (DSN);

memory that stores operational instructions; and processing circuitry operably coupled to the interface and to the memory, wherein the processing circuitry is configured to execute the operational instructions to:

determine status of a set of memory devices of one or more sets of storage units (SUs) that distributedly store a set of encoded data slices (EDSs) within the DSN, wherein a data object is segmented into a plurality of data segments, wherein a data segment of the plurality of data segments is dispersed error encoded in accordance with dispersed error encoding parameters to produce the set of EDSs;

process the status of the set of memory devices of the one or more sets of SUs to detect one or more memory devices thereof that are failing based on at least one criterion including based on at least one of interpreting a received error message, initiating a query, receiving a query response, initiating a memory test, or interpreting a memory test result;

determine a number of available EDSs of the set of EDSs among the set of memory devices of the one or more sets of SUs based on at least one of interpreting a list of slice responses, interpreting read slice responses, or interpreting one or more error messages;

when the number of available EDSs of the set of EDSs compares unfavorably to a data segment rebuild threshold level, issue at least one urgent read slice request to at least one SU of the one or more sets of SUs that is associated with at least one of the one or more memory devices that is failing to recover at least one additional available EDS of the set of EDSs there from;

receive the at least one additional available EDS of the set of EDSs from the at least one of the one or more memory devices that is failing; and facilitate temporary storage of the at least one additional available EDS of the set of EDSs within the DSN.

10. The computing device of claim 9, wherein the processing circuitry is further configured to execute the operational instructions to:

when the number of available EDSs of the set of EDSs compares unfavorably to the data segment rebuild threshold level, issue a plurality of urgent read slice requests to a plurality of SUs of the one or more sets of SUs that is associated with the at least one of the one or more memory devices that is failing to recover a plurality of additional available EDSs of the set of EDSs there from; and prioritize the plurality of urgent read slice requests based on at least one of deprioritizing one or more of other access requests and maintenance tasks or raising priority of execution of tasks related to issuing the plurality of urgent read slice requests.

11. The computing device of claim 9, wherein:

a decode threshold number of EDSs are needed to recover the data segment;

a read threshold number of EDSs provides for reconstruction of the data segment;

a write threshold number of EDSs provides for a successful transfer of the set of EDSs from a first at least one location in the DSN to a second at least one location in the DSN;

the set of EDSs is of pillar width and includes a pillar number of EDSs;

each of the decode threshold number, the read threshold number, and the write threshold number is less than the pillar number; and the write threshold number is greater than or equal to the read threshold number that is greater than or equal to the decode threshold number.

12. The computing device of claim 9 further comprising:

a SU of the one or more sets of SUs within the DSN, a wireless smart phone, a laptop, a tablet, a personal computers (PC), a work station, or a video game device.

13. The computing device of claim 9, wherein the DSN includes at least one of a wireless communication system, a wire lined communication system, a non-public intranet system, a public internet system, a local area network (LAN), or a wide area network (WAN).

14. A method for execution by a computing device, the method comprising:

determining status of a set of memory devices of one or more sets of storage units (SUs) that distributedly store a set of encoded data slices (EDSs) within a dispersed or distributed storage network (DSN), wherein a data object is segmented into a plurality of data segments, wherein a data segment of the plurality of data segments is dispersed error encoded in accordance with dispersed error encoding parameters to produce the set of EDSs;

processing the status of the set of memory devices of the one or more sets of SUs to detect one or more memory devices thereof that are failing based on at least one criterion;

determining a number of available EDSs of the set of EDSs among the set of memory devices of the one or more sets of SUs;

when the number of available EDSs of the set of EDSs compares unfavorably to a data segment rebuild threshold level, issuing, via an interface of the computing device that is configured to interface and communicate with the DSN, at least one urgent read slice request to at least one SU of the one or more sets of SUs that is associated with at least one of the one or more memory devices that is failing to recover at least one additional available EDS of the set of EDSs there from;

receiving, via the interface, the at least one additional available EDS of the set of EDSs from the at least one of the one or more memory devices that is failing; and facilitating, via the interface, temporary storage of the at least one additional available EDS of the set of EDSs within the DSN.

15. The method of claim 14 further comprising:

detecting the one or more memory devices thereof that are failing based on at least one criterion including based on at least one of interpreting a received error message, initiating a query, receiving a query response, initiating a memory test, or interpreting a memory test result.

16. The method of claim 14 further comprising:

determining the number of available EDSs of the set of EDSs among the set of memory devices of the one or more sets of SUs based on at least one of interpreting a list of slice responses, interpreting read slice responses, or interpreting one or more error messages.

17. The method of claim 14 further comprising:

when the number of available EDSs of the set of EDSs compares unfavorably to the data segment rebuild threshold level, issuing a plurality of urgent read slice requests to a plurality of SUs of the one or more sets of SUs that is associated with the at least one of the one or more memory devices that is failing to recover a plurality of additional available EDSs of the set of EDSs there from; and prioritizing the plurality of urgent read slice requests based on at least one of deprioritizing one or more of other access requests or maintenance tasks and raising priority of execution of tasks related to issuing the plurality of urgent read slice requests.

18. The method of claim 14, wherein:

a decode threshold number of EDSs are needed to recover the data segment;

a read threshold number of EDSs provides for reconstruction of the data segment;

a write threshold number of EDSs provides for a successful transfer of the set of EDSs from a first at least one location in the DSN to a second at least one location in the DSN;

the set of EDSs is of pillar width and includes a pillar number of EDSs;

each of the decode threshold number, the read threshold number, and the write threshold number is less than the pillar number; and the write threshold number is greater than or equal to the read threshold number that is greater than or equal to the decode threshold number.

19. The method of claim 14, wherein the computing device includes a SU of the one or more sets of SUs within the DSN, a wireless smart phone, a laptop, a tablet, a personal computers (PC), a work station, or a video game device.

20. The method of claim 14, wherein the DSN includes at least one of a wireless communication system, a wire lined communication system, a non-public intranet system, a public internet system, a local area network (LAN), or a wide area network (WAN).

* * * * *